(12) United States Patent
Nerstad et al.

(10) Patent No.: US 7,357,752 B2
(45) Date of Patent: Apr. 15, 2008

(54) POWER TRAIN SYSTEM HAVING CREEPER MODULE

(75) Inventors: Karl A. Nerstad, East Peoria, IL (US); James E. Winzeler, East Peoria, IL (US); Craig R. Rust, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 219 days.

(21) Appl. No.: 10/218,952

(22) Filed: Aug. 14, 2002

(65) Prior Publication Data

US 2003/0040398 A1    Feb. 27, 2003

Related U.S. Application Data

(60) Provisional application No. 60/312,588, filed on Aug. 15, 2001.

(51) Int. Cl.
*F16H 3/44* (2006.01)
(52) U.S. Cl. .................. 475/321; 475/317; 475/322
(58) Field of Classification Search ............ 475/317, 475/320, 321, 322, 331, 11
See application file for complete search history.

(56) References Cited

U.S. PATENT DOCUMENTS

| | | | | | |
|---|---|---|---|---|---|
| 1,870,076 | A | * | 8/1932 | Thomson ............... | 318/13 |
| 2,877,668 | A | * | 3/1959 | Kelbel ................... | 475/127 |
| 2,918,832 | A | * | 12/1959 | Meyers .................. | 475/142 |
| 3,069,929 | A | * | 12/1962 | Hansen .................. | 475/322 |
| 3,097,546 | A | * | 7/1963 | Kelbel et al. .......... | 475/136 |
| 3,359,833 | A | * | 12/1967 | Flinn ..................... | 475/127 |
| 4,407,399 | A | * | 10/1983 | Wolff .................... | 475/142 |
| 4,706,519 | A | | 11/1987 | Beim | |
| 4,860,615 | A | * | 8/1989 | Huber et al. ........... | 475/143 |
| 5,151,068 | A | * | 9/1992 | Mann et al. ........... | 475/322 |
| 5,953,035 | A | * | 9/1999 | Watanabe et al. ...... | 347/104 |
| 6,022,287 | A | * | 2/2000 | Klemen et al. ......... | 475/5 |

FOREIGN PATENT DOCUMENTS

| EP | 556903 | * | 8/1993 | ............. 475/322 |
|---|---|---|---|---|
| JP | 401058817 | * | 3/1989 | ............. 475/322 |

* cited by examiner

*Primary Examiner*—Ha D. Ho
(74) *Attorney, Agent, or Firm*—Finnegan, Henderson, Farabow, Garrett & Dunner

(57) ABSTRACT

A power train assembly is driveably engaged with an input source and includes a transmission module having a casing and a drive member. The transmission module is driveably connected to the input source and a creeper module is driveably engaged with the drive member of the transmission module. The creeper module is detachably mounted to the casing of the transmission module. An output assembly is in driving engagement with the creeper module and a control interface is configured to selectively engage the creeper module to transform the speed of the drive member to a reduced speed of the output member.

19 Claims, 4 Drawing Sheets

Fig-4

| GEAR | CREEPER TRANSMISSION SPEEDS | |
|---|---|---|
| | MPH | Km/h |
| 1F | 0.4 | 0.7 |
| 2F | 0.5 | 0.9 |
| 3F | 0.7 | 1.1 |
| 4F | 0.9 | 1.4 |
| 5F | 1.0 | 1.6 |
| 6F | 1.1 | 1.8 |
| 7F | 1.3 | 2.1 |
| 8F | 1.4 | 2.3 |
| 9F | 1.6 | 2.6 |
| 10F | 1.8 | 2.9 |
| 11F | 2.1 | 3.3 |
| 12F | 2.3 | 3.7 |
| 13F | 2.8 | 4.4 |
| 14F | 3.5 | 5.6 |
| 15F | 4.4 | 7.1 |
| 16F | 6.2 | 9.9 |
| 1R | 0.3 | 0.5 |
| 2R | 0.8 | 1.3 |
| 3R | 0.9 | 1.5 |
| 4R | 2.2 | 3.6 |

POWER TRAIN SYSTEM HAVING CREEPER MODULE

This application claims the benefit of prior provisional patent application Ser. No. 60/312,588 filed Aug. 15, 2001.

TECHNICAL FIELD

The present invention relates to a power train system having a gear reducing creeper assembly. More particularly, the invention pertains to a power train including a selectively activated creeper module.

BACKGROUND

In known power train systems having creeper capabilities the operator may select a low gear which is typically desirable when accurate and precise machine positioning is warranted. The power train system generally includes a transmission having a creeper gear assembly integrated into the transmission gearing within a transmission casing. Consequently, manufacturers are required to manufacture and stock several types of transmissions including transmissions having creeper capabilities and transmission without. Moreover, designers of creeper mechanisms are generally allowed little if any extra space within the transmission casing and are forced to maintain the creeper assembly within a compact space within the transmission casing.

For example, U.S. Pat. No. 4,706,519, issued to Beim and having an issue date of Nov. 17, 1987, discloses a transmission assembly including a creeper mechanism integrated into the transmission assembly. The creeper portion of the transmission, in addition to the transmission gearing are enclosed within a transmission casing. More specifically, a bulkhead is anchored to an interior of the casing and supports the creeper mechanism.

It is desirable to provide a power train system of simple construct which includes a creeper mechanism without a significant increase in cost of manufacture, processing and storage of additional components associated with this system. Further, a power train system which is easy to engage, disengage and disable without premature creeper component failure and wear is desirable.

The present invention is directed to overcoming one or more of the problems as set forth above.

SUMMARY OF THE INVENTION

In one aspect of the present invention a power train assembly is driveably engaged with an input source and includes a transmission module having a casing and a drive member. The transmission module is driveably connected to the input source and a creeper module is driveably engaged with the drive member of the transmission module. The creeper module is detachably mounted to the casing of the transmission. An output assembly is in driving engagement with the creeper module and a control interface is configured to selectively engage the creeper module to transform the speed of the drive member to a reduced speed of the output member.

In another aspect of the present invention a creeper module for receiving a drive member of a transmission rotating at a drive speed and being selectively engageable with an output assembly includes a housing disposed between the transmission module and the output assembly. A sun gear is in driving engagement with a ring gear through a plurality of planetary gears and said plurality of planetary gears are supported by a carrier member. A clutch assembly is rotatably supported by the housing and is configured to directly and driveably couple the output assembly with the drive member in a direct drive arrangement and is configured to directly and driveably couple the output shaft with the carrier member in a creeper drive arrangement.

BRIEF DESCRIPTION OF THE DRAWINGS

FIG. 4. is a chart showing the gear and respective speed of the power train system of FIG. 1.

DETAILED DESCRIPTION

Figure 1:
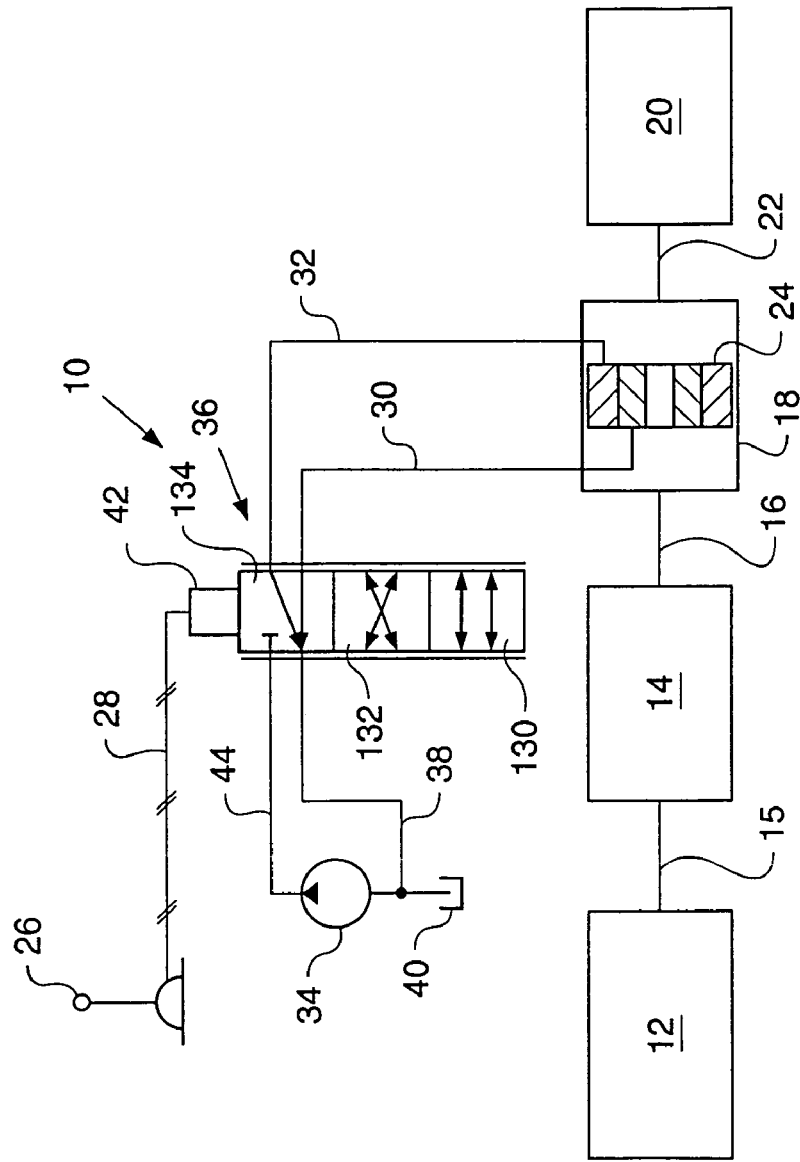
FIG. 1 is a schematic representation of a power train system according to the present invention.

Referring to FIG. 1, a power train system is driven by an input source 12, such as an internal combustion engine, for example. A transmission module 14 is mounted directly to the input source 12 through a drive engagement 15 such as a spline engagement or as is customary. The transmission module 14 includes a drive member 16 which connects with the creeper module 18. Creeper module 18 is coupled to an output assembly 20 through an output member 22.

Creeper module 18 includes a clutch assembly 24 which is effective to reduce the speed of drive member 16 and deliver the reduced speed output to output member 22. Alternatively, and as will be explained in detail hereinbelow, the creeper module 18 also includes a mode in which the speed of output member 22 substantially tracks the speed of drive member 16.

Creeper module 18 is selectively engaged by user manipulation of activation member 26 which transmits a signal to solenoid 42 through instrument line 28. In turn, solenoid positions operator 36 such that creeper module 18 is engaged, disengaged (to provide a 1:1 speed ratio between the drive and output member 16, 22), or placed in neutral.

Clutch assembly 18 is engaged when fluid is supplied to either hydraulic line 30 or 32 by pump 34 through supply line 44 and operator 36. Fluid pressure within clutch assembly 24 is relieved to tank 40 through operator 36 and return line 38. Although, operator 36 is illustrated as a three-position valve arrangement, it is envisioned that the operator 36 may include a two-position valve which eliminates the neutral mode.

Figure 2:
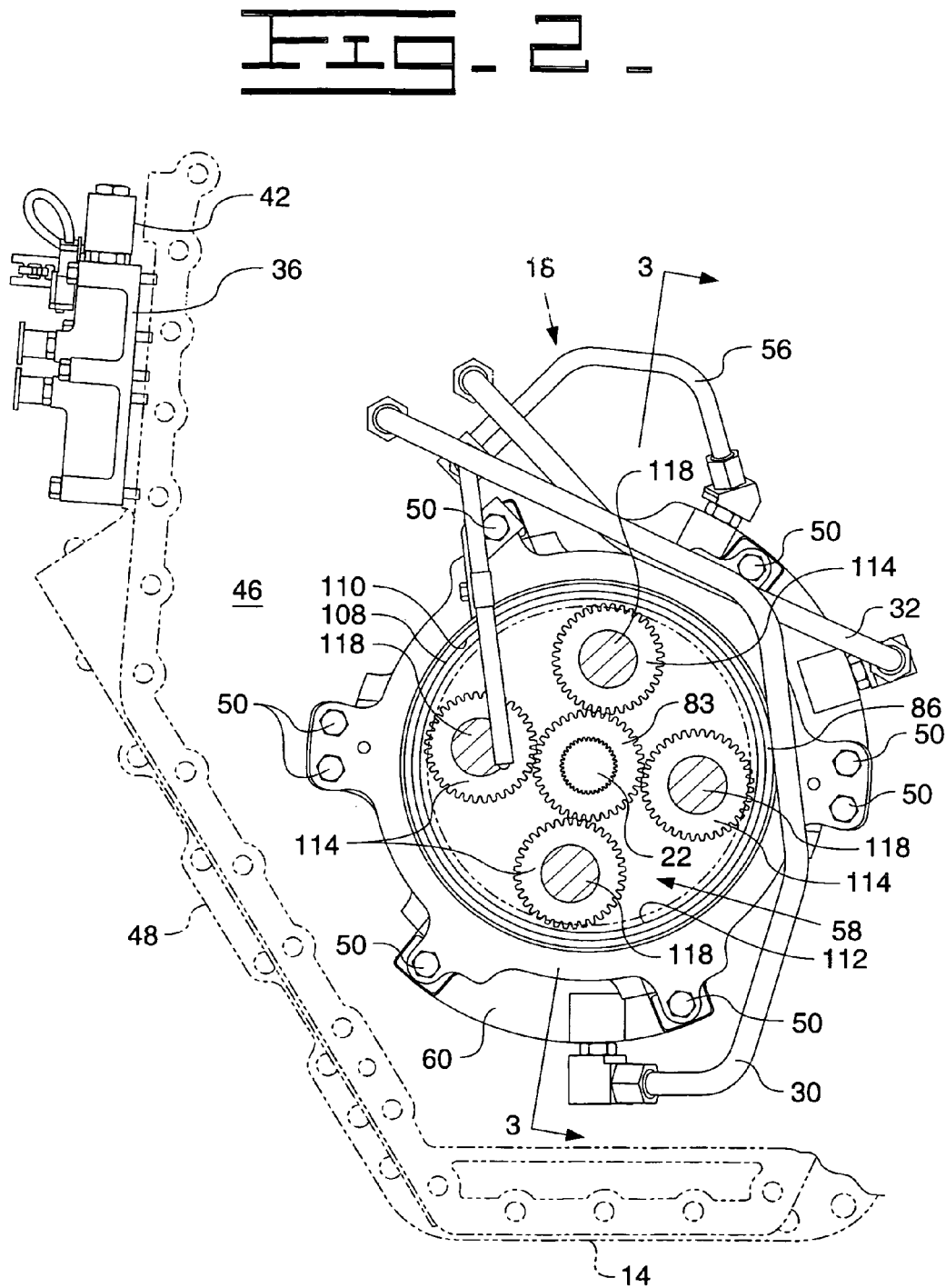
FIG. 2 is a perspective view of the creeper module and transmission of the power train system of FIG. 1, showing the creeper module attached to the transmission casing.

Referring to FIG. 2, the creeper module 18 is shown, and notably, creeper module 18 is mounted to an external portion 46 of a casing 48 of the transmission module 14 by bolts 50. Hence, power train system 10 may be constructed using a common transmission mechanism and by adding on the creeper module which eliminates the significant costs associated with designing, manufacturing and stocking multiple transmission types.

Figure 3:
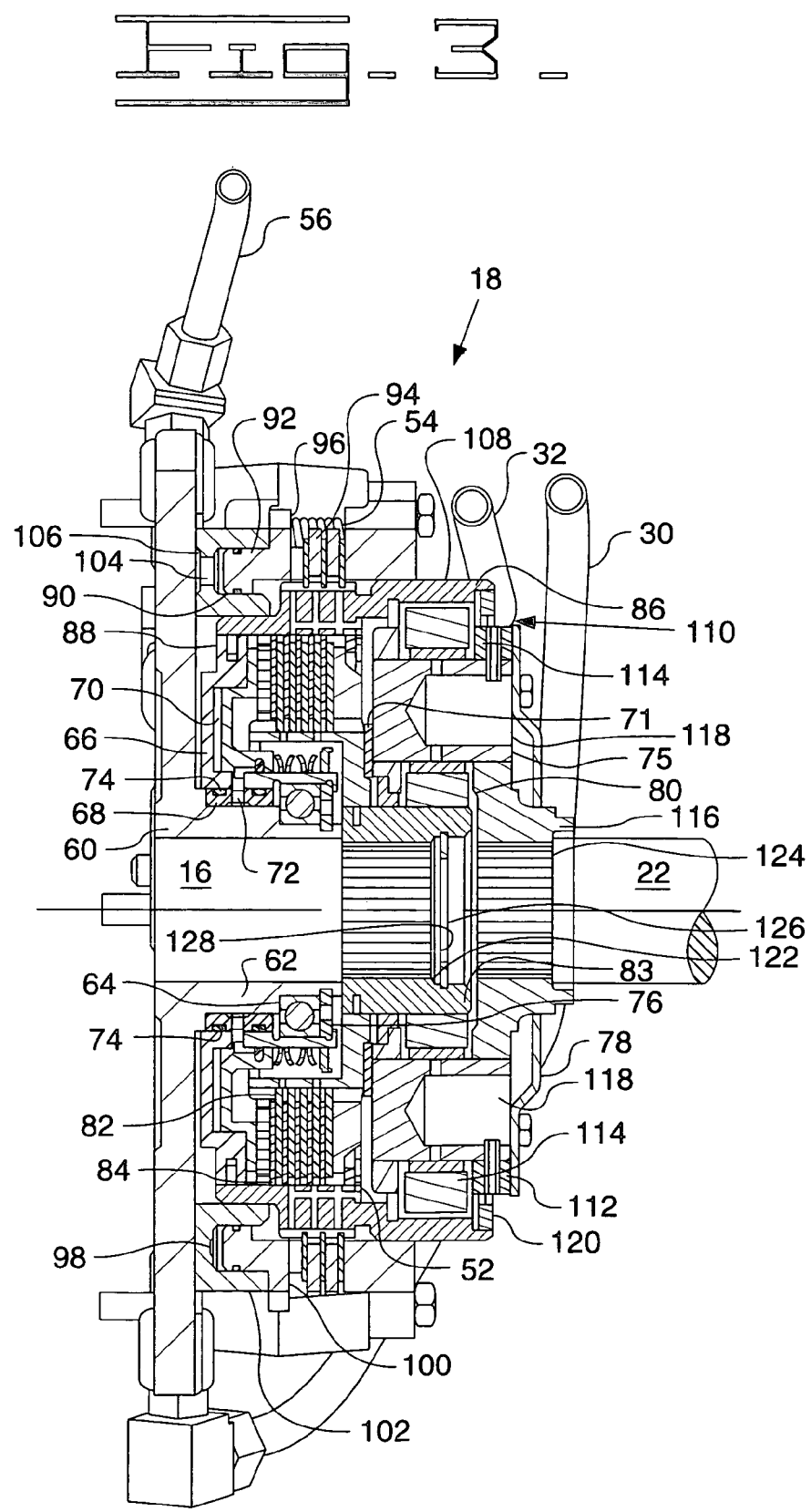
FIG. 3 is sectional view of the creeper module of FIG. 2 taken along line 2-2 of FIG. 2.

Referring again to FIG. 2, clutch assembly 24 of creeper module 18 is hydraulically connected to operator 36 through hydraulic lines 30, 32. Hydraulic line 30 is directly connected to a first clutch mechanism or a direct drive clutch 52 (FIG. 3) and hydraulic line 32 is connected to a second clutch mechanism or a creeper clutch 54 (FIG. 3). As best shown in FIG. 2, a lubrication line 56 supplies oil to creeper gear assembly 58.

Referring to FIG. 3, creeper module 18 includes a housing 60 having a collar portion 62 supporting a bearing assembly 64. Housing 60 abuts external portion 46 of transmission module 14 as is best shown in FIG. 2. A piston housing 66 is mounted on bearing assembly 64 such that piston housing 66 is rotatable relative to collar position 62 of creeper housing 60. A carrier ring 68 is attached to collar portion 62 and includes a pair of seals 74 which straddle through ports 72. Seals 74 provide a fluid seal between stationary housing 60 and rotatable piston housing 60. It may be seen that a fluid piston chamber 70 for the direct drive clutch 52 is formed between the piston housing 66 and axial moveable piston 71. Piston 71 is biased toward piston housing 66 by spring 78 which encircles rim 75 of piston housing 66. A retaining ring 76 retains both spring 78 and piston 71 on piston housing 66.

Inner clutch assembly or direct drive clutch 52 includes a plurality of axially spaced clutch plates 82 fixed to hub 80 through a spline engagement, for example. Hub 80 is splined to sun gear 83 and sun gear 83 is splined to drive member 16. Each clutch plate 82 is separated by an associated clutch plate 84 and each clutch plate 84 is fixed to ring gear 86 on an outer diameter thereof. Hence, clutch plates 82 inter-engage within clutch plates 84 and the inter-engage arrangement abuts piston 71 to form the direct drive clutch 52.

Outer clutch assembly or creeper clutch 54 is formed of a plurality of axially spaced clutch plates 92 which are attached, at an inner diameter thereof, to an outer portion 90 of ring gear 86 through a spline engagement, for example. Clutch plates 92 are separated by associated clutch plates 94 and clutch plates 94 are attached to an inner portion 96 of creeper housing 60.

A piston 98 abuts an axial end 99 of creeper clutch 54. Piston 98 is axially moveable within piston housing 100 and a piston chamber 104 is formed between piston 90 and housing 100. Chamber 104 is fluidly sealed through seal 102, captured within piston 90, and in sealing contact with the walls forming piston housing 100.

Ring gear 86 includes a projecting ring portion 108 which has an inner wall 110 defining a plurality of gear teeth 112 which mesh with planet gears 114 of creeper gear assembly 58. Creeper gear assembly includes sun gear 83, planet gears 114 and carrier member 116. Carrier member 116 includes gear support posts 118 which respectfully rotateably support planet gear 114. Retaining ring 120 retains carrier member 116 within ring gear 86. Carrier member 116 includes a splined portion 122 which is engaged by splined portion 124 of output member 22. Noteably, output member 22 includes a butt end 126 facing a butt end 128 of drive member 16. It may be seen that carrier member 116, fixed to output member 22, is independently rotatable relative to hub 80 and sun gear 83 which are fixed relation to drive member 16.

INDUSTRIAL APPLICABILITY

Referring now to FIG. 3, in operation, activation member 26 (FIG. 1) is manipulated by a user when creeper mode is desired and the operator 36 is shifted toward position 130 (FIG. 1). Pump 34 (FIG. 1) pressurized fluid toward creeper clutch mechanism 54 of creeper module 18 and power flow is directed from the drive member 16 of the transmission module 14 to the sun gear 83. Engagement of the creeper clutch "grounds" the ring gear 86 and power flows out of the creeper planetary assembly 58 through the carrier member 116 to the output assembly 20. The output assembly 20 may be a pinion shaft in mesh with a bevel gear to provide movement to ground engaging wheels of an earthmoving machine, for example. The speed of the output member at this point is now as low as one-fourth the speed of the drive member of the transmission module.

When direct drive and disengagement of the creeper module is desired, the activation member 26 (FIG. 1) is accordingly positioned and operator 36 (FIG. 1) is placed in position 132. Correspondingly, the direct drive clutch is engaged and the creeper clutch is disengaged. With the direct drive clutch engaged, power flows from the drive member of the transmission module to the sun gear, and the sun gear, the ring gear, and the carrier member, all rotate at the same speed. Power flows from the output member to the output assembly, however, now the speed ratio between the drive member speed and output member speed is 1:1.

In a third position indicated as 134 (FIG. 1), operator 36 blocks all pump flow to the clutch assembly which disables the creeper module. Accordingly, the drive member rotates, however the output member includes little if any movement and the creeper module is in a neutral mode.

Referring to FIG. 4, listed an exemplary transmission gears of a 16 forward, 4 reverse transmission attached to the present invention creeper module and associated speed relative to each gear. It may be seen that the creeper module provides a forward speed range of 0.4 mph to 6.2 mph and a reverse speed range of 0.3 mph to 2.2 mph.

What is claimed is:

1. A power train assembly driveably engaged with an input source, the power train assembly comprising:
    a transmission module being driveably connected to the input source and including a transmission mechanism and a drive member driveably connected to the transmission mechanism, said transmission module being substantially enclosed within a casing;
    a creeper module being substantially enclosed within a housing and said creeper module being driveably engaged with said drive member of said transmission module, said housing of said creeper module being detachably mountable to an external portion of said casing;
    an output assembly including an output member being in driving engagement with said creeper module; and
    a control interface being configured to selectively engage the creeper module to transform a first speed of the drive member to a second speed of the output member,
    wherein detaching the housing from the casing does not require disassembling the transmission module from the casing,
    wherein said creeper module includes a clutch assembly operative to selectively and alternatively transmit said first speed of said drive member to said second speed of said output member, wherein said first speed and said second speed are substantially the same, and
    wherein said clutch assembly is operative to disengage said drive member and said output member in a neutral mode, wherein said second speed of the output member is substantially zero.

2. A power train assembly driveably engaged with an input source, the power train assembly comprising:
    a transmission module being driveably connected to the input source and including a transmission mechanism and a drive member driveably connected to the transmission mechanism, said transmission module being substantially enclosed within a casing;
    a creeper module being substantially enclosed within a housing and said creeper module being driveably engaged with said drive member of said transmission module, said housing of said creeper module being detachably mountable to an external portion of said casing;

an output assembly including an output member being in driving engagement with said creeper module; and a control interface being configured to selectively engage the creeper module to transform a first speed of the drive member to a second speed of the output member, wherein said control interface includes a selectively activated operator in communication with said creeper module and configured to be selectively positionable in response to user input, wherein said operator includes a three position valve arrangement comprising:

a neutral position wherein said second speed of said output member of said output assembly is substantially zero;

a non-engaged position wherein said second speed of said output member is in tracking relation to said first speed of said drive member of said transmission module, and an engaged position wherein said second speed of said output member is different than said first speed of said drive member.

3. The power train assembly of claim 2 wherein said creeper module includes a clutch assembly operative to selectively and alternatively transmit said first speed of said drive member to said second speed of said output member in response to the position of the valve arrangement.

4. The power train assembly of claim 3 wherein said clutch assembly is operative to disengage said drive member and said output member in said neutral mode.

5. The power train assembly of claim 2 wherein said second speed of said output member is up to 4 times less than said first speed of said drive member in said engaged position.

6. The power train assembly of claim 3 further including a second clutch assembly, wherein said clutch assembly is positioned radially inside of said second clutch assembly.

7. The power train assembly of claim 2 wherein said operator is in communication with said creeper module to selectively transmit said first speed of said drive member to said second speed of said output member.

8. The power train assembly of claim 7 wherein said control interface comprises an activation member controllable directly by a user to transmit a signal to said operator.

9. A power train assembly comprising:

a transmission configured to produce a plurality of gear ratios, the transmission being driveably connected to an input shaft and substantially enclosed within a transmission casing;

a creeper module driveably connected to a drive member of the transmission and configured to selectively transmit the speed of the drive member to an output member;

a housing substantially enclosing the creeper module and being detachably mountable to an external portion of the transmission casing so as to detachably mount the creeper module to the transmission; and a control interface being configured to selectively engage the creeper module so that the creeper module selectively transmits a first speed of the drive member to a second speed of the output member, wherein the control interface comprises a valve in communication with the creeper module, the valve having at least two positions comprising:

a non-engaged position wherein the second speed of the output member is in tracking relation to the first speed of the drive member of the transmission module, and an engaged position wherein the second speed of the output member is different than the first speed of the drive member.

10. The power train assembly of claim 9 wherein detaching the housing from the casing does not require disassembly of the transmission from the transmission casing.

11. The power train assembly of claim 9 wherein the creeper module includes a clutch assembly configured to be selectively engaged to transmit the first speed of the drive member to the second speed of the output member in response to the position of the valve.

12. The power train assembly of claim 11 wherein the second speed of the output member is up to 4 times less than the first speed of the drive member in the engaged position of the valve.

13. The power train assembly of claim 11 wherein the clutch assembly disengages the drive member and the output member when the valve is in the non-engaged position of the valve.

14. The power train assembly of claim 11 wherein the clutch assembly is configured to be placed in a neutral mode, wherein the second speed is substantially zero.

15. The power train assembly of claim 11 wherein the creeper module further comprises a second clutch assembly, wherein the clutch assembly is positioned radially inside of the second clutch assembly.

16. The power train assembly of claim 9 wherein the control interface is in communication with the creeper module to control the creeper module in response to user input.

17. The power train assembly of claim 16 wherein the control interface comprises an activation member directly controllable by a user to transmit a signal to the valve.

18. The power train assembly of claim 9 wherein the valve comprises a solenoid to move the valve between the at least two positions.

19. The power train assembly of claim 9 wherein the valve further comprises a neutral position in which the second speed of the output member of the output assembly is substantially zero.

* * * * *